(No Model.) 6 Sheets—Sheet 1.

T. G. & H. DAW.
APPARATUS FOR PRODUCING IMPRESSED AND PRINTED SURFACES.

No. 362,496. Patented May 10, 1887.

(No Model.) 6 Sheets—Sheet 3.

T. G. & H. DAW.
APPARATUS FOR PRODUCING IMPRESSED AND PRINTED SURFACES.

No. 362,496. Patented May 10, 1887.

Witnesses:
E. F. Tourtellotte.
C. J. Maguire

Inventor
T. G. & H. Daw
By
Curtis & Crocker
Attorneys (No Model.) 6 Sheets—Sheet 4.
T. G. & H. DAW.
APPARATUS FOR PRODUCING IMPRESSED AND PRINTED SURFACES.
No. 362,496. Patented May 10, 1887.

Witnesses:
E. F. Tourtellotte.
C. J. Maguire.

Inventor
T. G. & H. Daw
By
Curtis & Crocker
Attorneys.

(No Model.) 6 Sheets—Sheet 5.

T. G. & H. DAW.
APPARATUS FOR PRODUCING IMPRESSED AND PRINTED SURFACES.

No. 362,496. Patented May 10, 1887.

Witnesses:
E. F. Tnrtlettotte.
Chas. J. Maguire

Inventor
T. G. & H. Daw
By Curtis & Crocker
Attorneys

N. PETERS, Photo-Lithographer, Washington, D. C.

(No Model.) 6 Sheets—Sheet 6.

T. G. & H. DAW.

APPARATUS FOR PRODUCING IMPRESSED AND PRINTED SURFACES.

No. 362,496. Patented May 10, 1887.

UNITED STATES PATENT OFFICE.

THOMAS GEORGE DAW AND HILDER DAW, OF SEVENOAKS, COUNTY OF KENT, ENGLAND.

APPARATUS FOR PRODUCING IMPRESSED AND PRINTED SURFACES.

SPECIFICATION forming part of Letters Patent No. 362,496, dated May 10, 1887.

Application filed November 11, 1885. Serial No. 182,421. (No model.) Patented in England, January 1, 1884, No. 246, and April 19, 1884, No. 6,581; in France December 1, 1884, No 165,695, and in Belgium December 1, 1884, No.67,066.

*To all whom it may concern:*

Be it known that we, THOMAS GEORGE DAW and HILDER DAW, subjects of the Queen of Great Britain and Ireland, residing at Sevenoaks, in the county of Kent, Kingdom of Great Britain and Ireland, have invented new and useful Improvements in Apparatus for Producing Impressed and Printed Surfaces, (for which we have obtained patents in Great Britain, No. 246, bearing date January 1, 1884 and No. 6,581, dated April 19, 1884; in France, No. 165,695, dated December 1, 1884, and in Belgium, No. 67,066, dated December 1, 1884,) of which the following is a specification.

This invention relates to the construction of apparatus by means of which matrices or molds for stereotype-plates can be impressed on a sheet or ribbon of paper or other material be printed in a more simple, expeditious, and economical manner than has heretofore been practicable, and refers more particularly to means whereby the matrix or sheet of paper or other material may be moved forward at each advance by a distance exactly equal to the width of the letter or character last impressed or printed, thus producing an evenness or regularity in the impression or printing similar to that which obtains in ordinary printing.

Referring to the accompanying six sheets of illustrative drawings, wherein the same reference-numerals are used to denote like parts wherever they occur in the several figures, Fig. 4ᵃ is a detached view of a modified form of apparatus for regulating the oscillation of a band or wheel, hereinafter described, according to the size of font of type employed. Fig. 6ᵃ is a similar view of a shaft having a regular screw-thread, shown in Fig. 1. Figs. 10ᵃ and 10ᵇ show in plan and transverse section, respectively, parts of a modified form of machine.

1 1 are a series of type arms or levers, that may be equal in number to the pieces of a complete font of type. Each carries at its upper end a type or type piece, 2, secured by screwing or otherwise, and hinged at its lower end to the circular frame or ring 3 of the machine conveniently, by means of a continuous wire or pin, 4, extending through and around the ring 3, or by separate pins.

Figure 1:
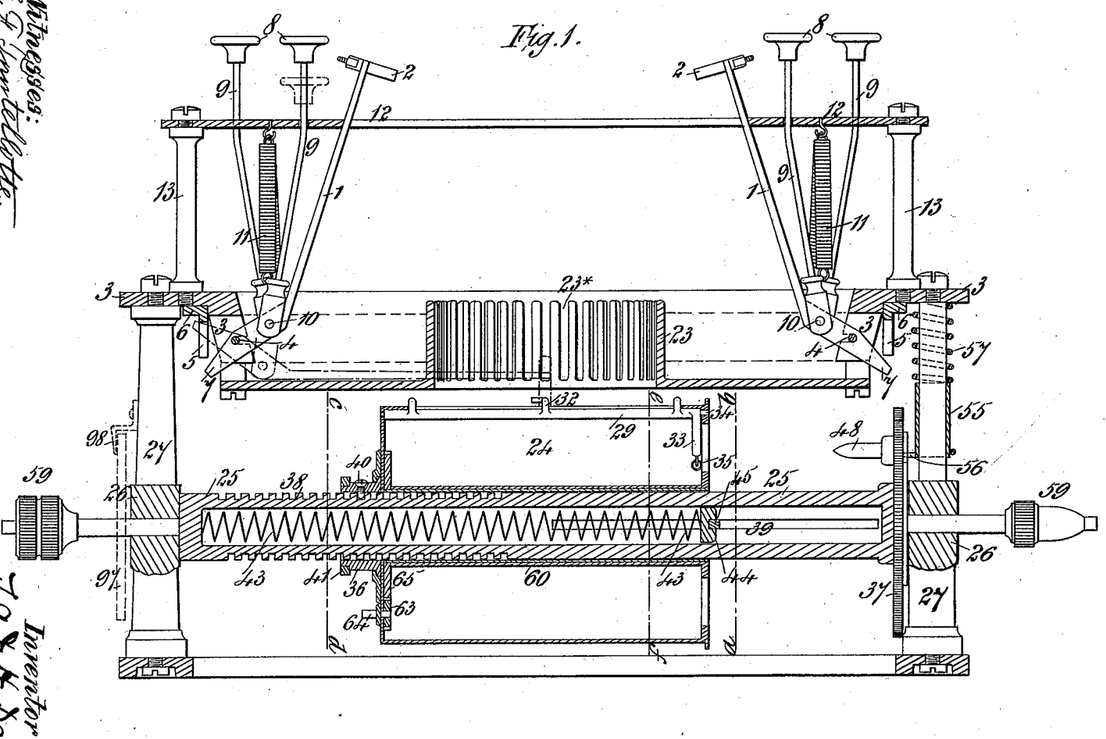
Figure 1 is a vertical section, Fig. 2 a side view, partly in section, Fig. 3 a view at right angles to Fig. 2, and Fig. 4 a plan or top view, of so much of the apparatus, according to our invention, as is necessary to illustrate the same.
Figure 2:
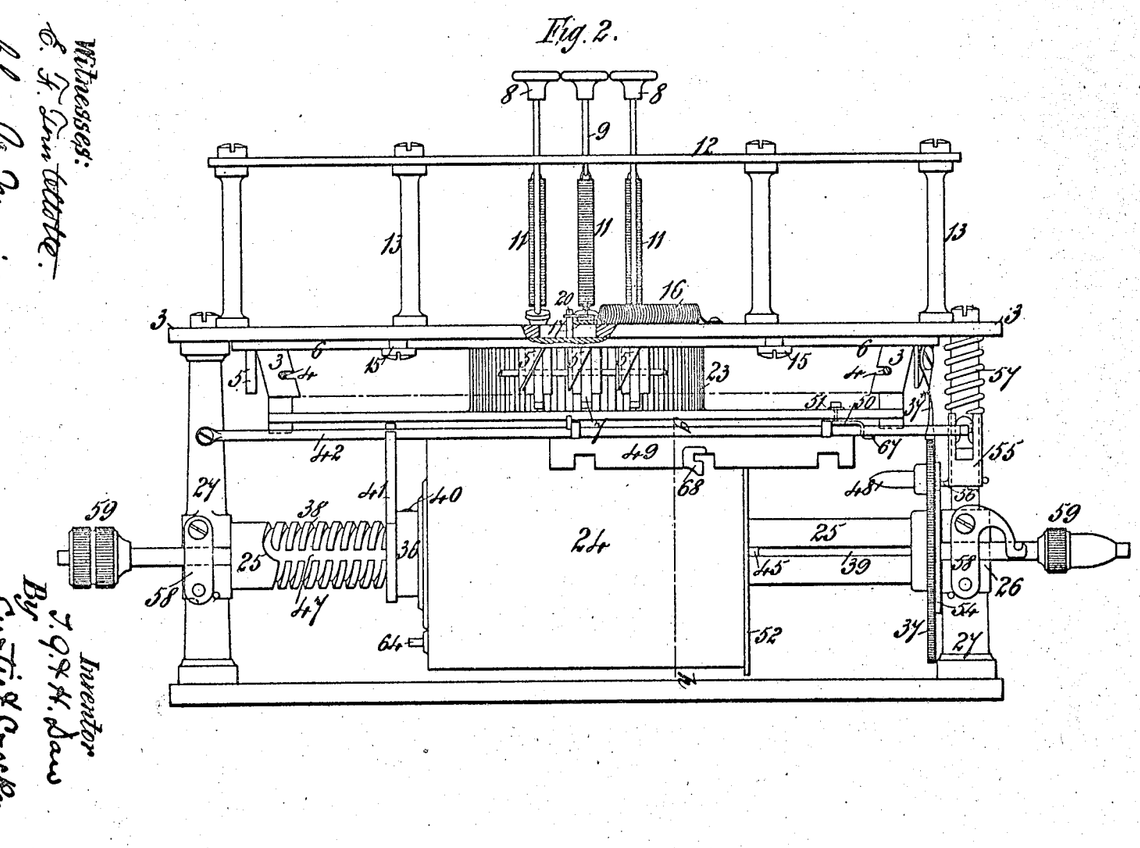
Figure 3:
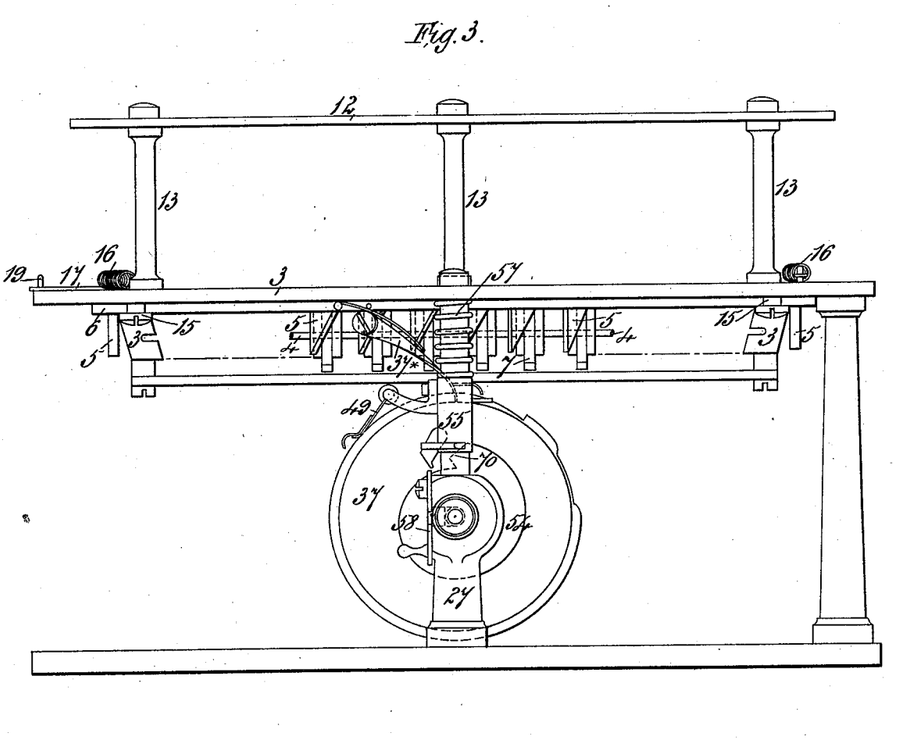
Figure 5:
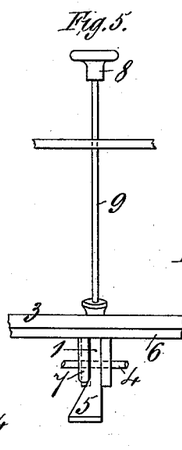
Fig. 5 is an elevation showing a modified arrangement of parts for imparting motion to the band or wheel.

5 5 are pieces of inclined wedge-like or equivalent form, (as, for example, curved,) formed with or attached to the arms or levers 1, Fig. 5, or to the band or wheel 6 when teeth or projections 7 are formed with or attached to 1, as in Figs. 1, 2, and 3.

Figures 4, 4A:
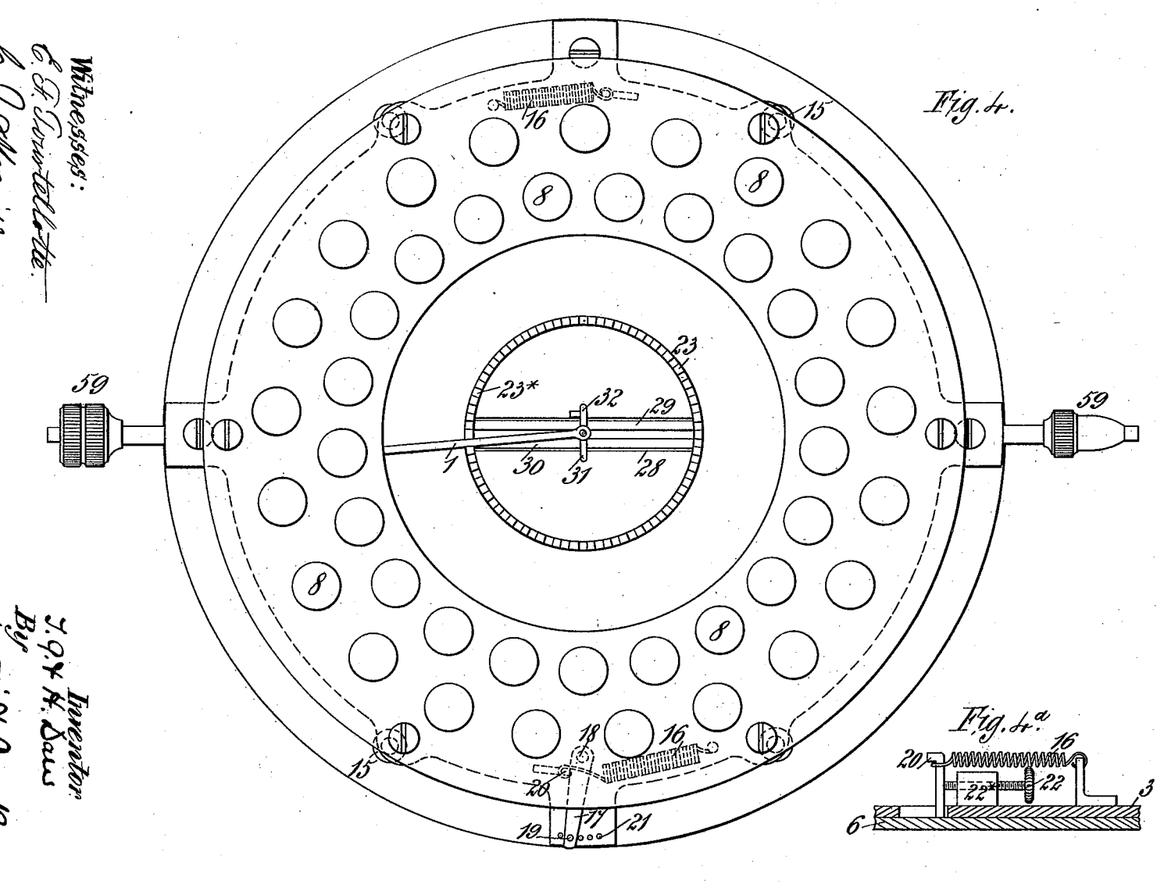

8 8 are finger-keys connected by means of the rods 9 and pins or pivots 10 to the arms or levers 1, and 11 11 are springs connected at one end to the arms or levers 1 or to the rods 9, and at their other ends to the ring or piece 12, carried by the pillars 13 and serving to maintain the arms or levers 1 with their type-pieces 2 in their raised or upward position, as shown in Fig. 1, when not depressed by the finger-keys 8. The said arms or levers 1 are preferably arranged in a circle, as indicated by Fig. 4, and, as shown, are so connected and arranged that each type-piece, when in its depressed or downward position, shall be brought to the same point.

To more clearly indicate the construction and arrangement of the type arms or levers and their attached parts, and to prevent confusion, a few only of them are shown in the drawings.

6 is an oscillating band or wheel, preferably arranged and supported below and exterior to the fixed ring 3, by means of pins or bolts 15, in such manner as to be capable of a short circular or oscillatory motion in one direction in opposition to, and in the contrary direction by the operation of, springs 16.

For the purpose of regulating the extent of motion of the band or wheel 6, a bar or lever, 17, pivoted at 18 and provided with a pin, 19, may be employed.

20 is a pin or projection on the band or wheel 6. One end of one of the springs 16 is secured to the said pin or projection, which normally rests against one side of the lever 17.

21 is a series of holes or recesses in the frame of the machine, into one or other of which the pin 19 may enter and hold the lever 17 in any desired fixed position relative to the travel of the pin 20, whereby the oscillation of the band or wheel 6 may be regulated according to the size of font of type employed.

In Fig. 4ª, which is a detail view in elevation, is shown a modified arrangement for regulating the extent of motion of the band 6 according to the size of font of type employed. In this arrangement 22 is a screw working in a nut, 22*, carried by the ring 3, and normally in contact with a projection or pin, 20, secured to the band or wheel 6, with which 20 moves, there being a slot in the ring 3, in which 20 works. By adjusting the position of the screw 22, the extent of the oscillation of the said band or wheel may be regulated, as will be readily understood, for the purpose stated.

7 7 are teeth or projections carried by or formed in one with the band or wheel 6, as shown in Fig. 5, or with the arms or levers 1 (see Figs. 1 and 2) if the pieces 5 be carried by the band or wheel 6. It will be understood that in the arrangement shown in Figs. 1 and 2 the teeth or projections 7 act against the inclined or wedge-shaped pieces 5; but in the reverse arrangement, Fig. 5, the inclined or wedge-shaped pieces 5 act against the teeth or projections 7, carried by the band or wheel 6.

23 is a ring or frame provided with vertical slots 23*, equal in number to that of the arms or levers 1. These slots serve as guides for the said levers 1, to prevent their free ends vibrating and to bring all the type-pieces 2 to one point when depressed, thus insuring that the impressions or printing in the matrix or mold and on the paper, respectively, shall be accurately in line. In lieu of the slotted ring, there may be employed a ring frame or spider having a hole in its central portion, through which each type-piece 2 may pass when depressed, the said hole serving as a guide thereto, for the purpose above stated.

24 is a hollow cylinder or table for carrying the matrix or mold to be impressed or the sheet or ribbon of paper or other material to be printed. This hollow cylinder or table is mounted upon a shaft, 25, having a screw-thread (or threads) for a part of its length and supported in bearings 26, carried by the supports or pillars 27 of the apparatus or machine.

Figure 9:
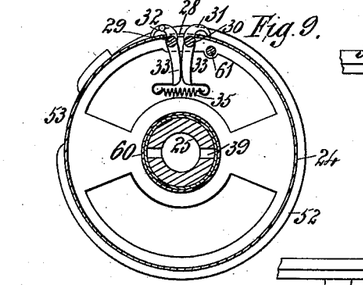

28 (see Figs. 9 and 10) is a longitudinal slot or opening in the cylinder 24.

29 and 30 are shafts or spindles arranged at the longer sides of the slot and carrying grippers 31 and 32 for holding a matrix or mold or sheet of paper or other material close against the surface of the cylinder 24 while being impressed or printed. The spindles 29 and 30 have each at one end a projecting piece or lever-arm, 33, pivoted at 34, Fig. 7, the free ends of these lever arms being connected by a spring, 35, or equivalent device, tending to move the said ends together and normally causing the grippers 31 and 32 to securely grip the material on the cylinder 24. One end of the cylinder 24 is connected to and carried in a bearing in the collar 36. The shaft 25 is provided at one end with a ratchet-wheel, 37, whereby it receives a partial rotation every time a character is impressed or printed, by means of the ring 6 and pawl 37*. Instead of a ratchet-wheel and pawl, we may employ a wheel, to which motion is imparted from the band or wheel 6 by a frictional grip, as will be readily understood. The shaft 25 has a square-cut path or screw-thread, 38, upon about one half of its length, and two longitudinal slots, 39, cut in the other part of its length, the said slots being arranged diametrically opposite each other. The collar 36 is provided with a pin or projection, 40, which engages with and travels in the path or screw-thread 38, and with a projecting arm, 41, Figs. 2 and 8, having a slotted end, which slides along a fixed bar, 42, secured to the frame of the machine and arranged parallel to the axis of the shaft 25. By these means the collar 36 is advanced along the screw-thread 38, but prevented from rotating with the shaft 25 when the latter is rotated, the cylinder 24 being simultaneously rotated with the said shaft and advanced thereon, as required, in a manner that will be readily understood.

Figure 6:
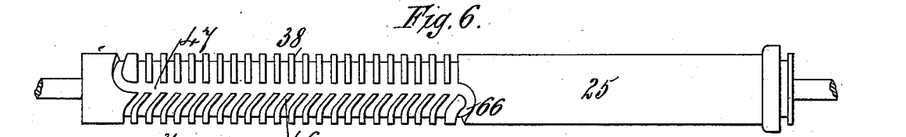
Fig. 6 is a detached view of a shaft having an intermittent screw-thread.
Figure 6A:
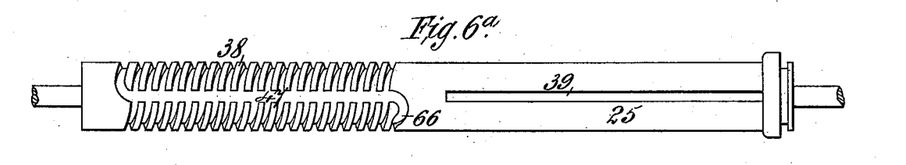

Within the hollow screw-shaft 25 is a spring, 43, which rests at one end against the end of the interior of the shaft, while its other end bears against a piece, 44, that bears upon a cross-piece, 45, inserted through the slots 39, and carried by one end of the cylinder 24, the object of the arrangement being to automatically carry the cylinder back to its starting-point when required. The screw-thread 38 of shaft 25 may have an irregular pitch, as shown in Fig. 6, or a regular pitch, as shown in Fig. 6ª. In the former case, which obtains when the lines are to be arranged one under the other in the usual way, the screw-thread or groove 38 is at right angles to the axis of the shaft 24 for the greater part of each revolution, as shown, and steps up suddenly at the incline 46 during the remaining portion, causing the pin or projection 40 to pass from one groove to the next, and thus producing a sudden and intermitting endwise feed of the cylinder 24. In the latter case a regular but slow endwise feed is imparted to the cylinder 24, the impressions or printing being then arranged in a helix from end to end. This arrangement of regular feed may be used when impressing or printing with small type, while the arrangement for intermittent feed may be employed when using large type.

47 is a groove or path cut through the screw-thread 38, to allow of the pin 40 being returned direct to its original position at one end of the screw-threads by means of the spring 43. In lieu of this groove or path 47 being straight, as shown, it may be in the form of a screw-thread of large pitch, the pin 40 being in this case caused to travel back through the groove or path by turning the shaft 25 by hand.

Figure 7:
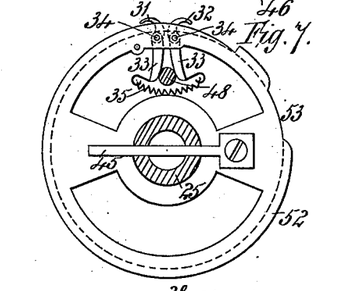
Figs. 7, 8, and 9 are transverse sections on the lines *a b*, *c d*, and *e f*, respectively, Fig. 1.

48 is a pin or projection on one side of the ratchet-wheel 37, arranged to pass between and separate the ends of the lever-arms 33, as shown in Fig. 7, whereby the grippers are removed from contact with the matrix or paper on the cylinder. The matrix or paper being thus released, falls away.

Figure 8:
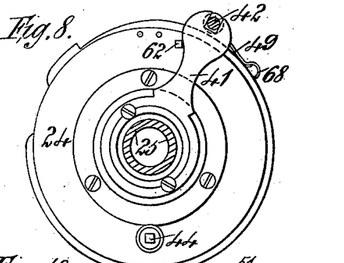

49 is a plate pivoted on the bar 42, and provided with a bent piece of wire, 50. Upon this bent piece of wire a spring, 51, bears and normally keeps the plate 49 in its raised or open position, as shown in Fig. 8. On one end of the cylinder 24 is a projecting rim or edge, 52, cut away at 53, for a purpose hereinafter specified.

54 is a cam attached to one side of or formed in one with the ratchet-wheel 37, and 55 is a sliding piece or collar on the support 27. The sliding piece 55 is provided with a pin or projection, 56, which is kept in contact with the exterior surface of the cam 54 by a spring, 57.

58 58 are pivoted plates serving to retain the end portions of the shaft 25 in the bearings 26. By turning the plates upward the shaft and attached parts may be readily removed from the machine. The shaft 25 is provided with milled ends 59 or with a winch-handle, for the purpose of conveniently turning the same by hand when desired.

When the apparatus now being described is to be used as a type-writer for printing paper or other material, ink or color is imparted to the paper by the cylinder or otherwise, the cylinder being overlaid with prepared paper or other suitable preparation. The printed impressions are thus produced on the reverse side to that which is struck, the type-pieces themselves having a clean surface, whereby they require no washing. A supply of color is provided by using a ribbon or sheet of prepared paper or other substance wound upon a roller, 60, encircling the hollow axis of the cylinder 24. One end of this paper or other substance (not shown in the drawings) passes through the slot 28, encircles the cylinder, and re-enters the same through the said slot and is finally wound upon a second roller or bar, 61, Figs. 9 and 10, mounted within the cylinder. When the color becomes exhausted, a fresh portion of paper is moved or drawn forward from the roller 60 by the roller 61, operated by a key fitting a projecting arbor, 62, thereon, this operation being assisted by a gear-wheel, 63, rotated by means of a key fitting its arbor 64, and gearing with a second gear-wheel, 65, secured to the roller 60, whereby the paper is unwound, as will be readily understood.

The operation of the apparatus or machine is as follows: Supposing a sheet of paper or other material on the cylinder 24 to have been filled with print or impressions, and that the cylinder itself is returning to the right-hand end of the machine, as seen in Figs. 1 and 2, then as it reaches the end of its stroke the pin 48 passes between the ends of the lever-arms 33, opens the grippers, and allows the paper previously printed or impressed to fall away from the cylinder. While the grippers are open a new sheet of paper is inserted under the series of grippers 31 and the shaft 25 rotated by hand, whereby the pin 40 passes from the curved portion 66 of the screw-thread 38 to the beginning of the first screw-thread, and the cylinder is moved slightly forward. This movement causes the pin 48 to become disengaged from the lever-arms 33, thereby allowing the grippers to close and one series of them to hold one end of the paper, while the end 67 of the bent wire 50, which previously passed through the opening at 53, is caused to mount upon the rim or edge 52 and throw over the folder or plate 49 into contact with the paper on the cylinder, and as the latter revolves folds the paper smoothly thereon. When the cylinder has nearly completed a revolution, and it and the folder 49 are in the position shown in Fig. 10, then upon further movement of the cylinder a curved projecting piece, 68, on the folder passes beneath a pin, 69, projecting from the center gripper of the series 32, thereby momentarily opening the said series and allowing the folder to place the remaining end of the paper beneath the said series of grippers, where it is held securely. The above rotation of the cylinder and shaft causes the cam 54 to raise the pin 56 against the action of the spring 57 until the said pin 56 reaches the inclined portion 70, Fig. 3, of the cam, down which it is forced by the action of the said spring 57, this action causing the shaft and cylinder to suddenly and quickly move forward through a short space, whereby the pin 40 is made to pass from one screw-thread up an incline, 46, to the next screw-thread and feed the cylinder endwise, when an intermittent feed is used for the next line. At the same time this quick motion of the cylinder causes the grippers and slotted portion 28 of the cylinder 24 to revolve forward, so that a type-piece, when next depressed, shall strike upon the solid portion of the cylinder and not through the slot. This motion, which is entirely automatic and independent of any action of the operator, causes the cylinder after the completion of one line of impression to be immediately placed in position for the commencement of another line. The letters or characters are then printed on the sheet of paper, as follows: Upon depressing a finger-key, 8, an arm or lever, 1, carrying a type-piece, 2, is immediately depressed into its downward position, (shown in dotted lines in Fig. 1,) the said arm or lever coming into contact either with the bottom of its slot 23* in the ring or frame 23 or with the top of the ring frame or spider, when used in lieu of the slotted ring, and causing a print on the paper to be made. This downward movement of an arm or lever, 1, will cause its attachment 5 or 7, as the case may be, to come into contact with the corresponding attachment, 7 or 5, of the band or wheel 6, thereby moving it in a rotary sense to an extent depending upon or corresponding with the width of the letter, figure, or other character just printed on the paper, the partial rotation or motion being made in opposition to the action of the spring or springs 16. This forward motion of the band or wheel 6 will cause the pawl or detent 37* to slip over a definite number of teeth of the ratchet-wheel 37. Upon the pressure being removed from the depressed finger-key 8 its arm or lever 1 and its attached parts will immediately be raised to their upward position by their spring 11, the band or wheel 6 being simultaneously moved in a backward direction by its spring or springs 16, thereby causing the ratchet or feed wheel 37 and cylinder 24 to move in a rotary sense to a small extent, thus rotating the cylinder 24 and attached sheet of paper or other material to an extent equal to the width of the letter or character last printed.

The above-described operations are repeated for each impression of a letter, character, or space. As each line of printing is made by the successive depressions of the type-pieces 2, the cylinder is advanced endwise, as hereinbefore described, the spring 43 being gradually compressed by the cross piece 45 until the pin 40 reaches the end of the screw-thread 38, whereupon the said pin 40 enters the groove 47, and is carried, together with the cylinder 24, back to the right-hand side of the machine by the force of the said compressed spring 43. Here the printed sheet is released, as heretofore described. The operations above described may then take place to print another sheet. Instead of using prepared paper or other material for supplying color, as just described, an arrangement of type arms and levers and means for inking the type-pieces thereof may be employed, if desired.

In lieu of employing a sheet of paper to be printed, a paper or other matrix or mold may be secured to the cylinder 24, letters, figures, or other characters being then impressed therein by depressing the arms or levers carrying the same, in a similar manner to that above described, of a uniform depth, for the subsequent production of a stereotype-plate.

If the substance to be printed or impressed be operated on upon a flat table, the feed may also be effected by the screw described above, the gripping and inking mechanism being modified to suit the altered circumstances.

Figure 10:
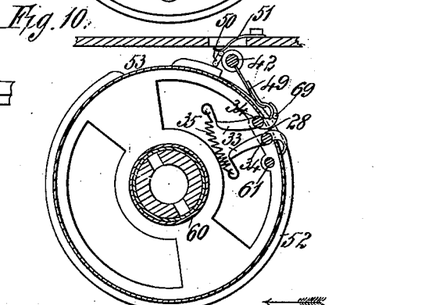
Fig. 10 is a transverse section on the line *g h*, Fig. 2.
Figure 10A:
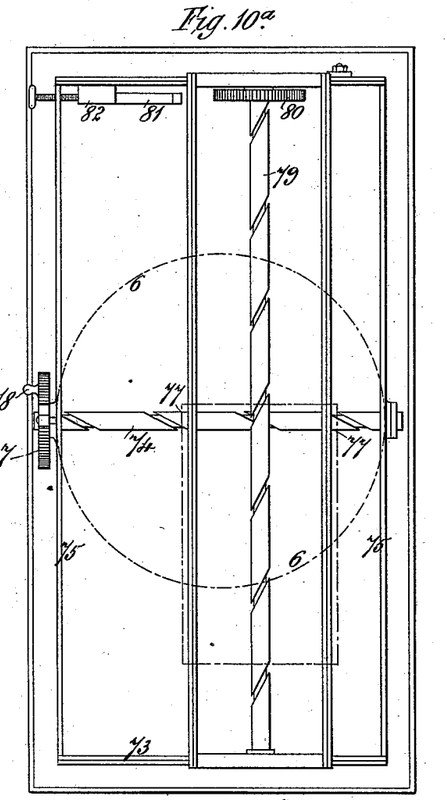
Figure 10B:
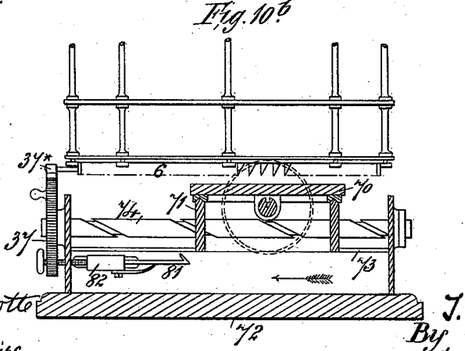
Figure 11:
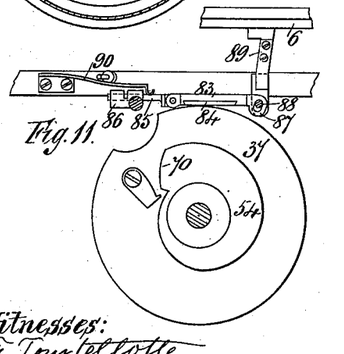
Figs. 11 and 12 are detail views showing a modified form of apparatus for feeding the cylinder or table that carries the material to be impressed or printed.
Figure 12:
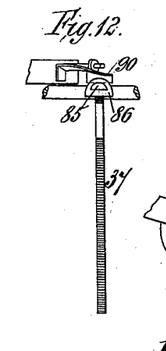

In the modified machine represented in Figs. 10ª and 10ᵇ, which are respectively a plan or top view and an end view, partly in transverse section, a table, 70, for supporting the matrix or sheet of paper, and carried by a cradle, 71, are each actuated by means of screws.

72 is the bed-plate of the apparatus, carrying ways 73 for supporting the cradle 71, which carries the carriage or table 70.

74 is a transverse screw carried by the end frames, 75, of the ways 73. It carries at one end a ratchet-wheel, 37, suitably arranged to be operated in one direction by the pawl or detent 37* on the oscillating band or wheel 6, indicated in Fig. 10ª by the dotted circle. Projections at 77 77 on the cradle 71 are caused to enter the screw-thread of the screw 74.

It will be readily seen from the above description that each backward motion of the band or wheel will impart a smooth and direct step-by-step motion of the required extent to the cradle 71, to form a line of words, upon the completion of which the cradle is returned to its original position for another line by means of a handle, 78; or it may be returned by a spring.

79 is a longitudinal screw carried by the ends of the cradle 71 and engaging with one or more projections on the table.

80 is a ratchet-wheel carried at one end of the screw-shaft 79, for the purpose of rotating it a short distance on the completion of a line of words and advancing the carriage or table 70 a distance equal to or more than the space depth or size of the font.

The ratchet-wheel is rotated as follows: As the cradle moves in the direction of the arrow, Fig. 10ᵇ, and when near the end of its travel, the ratchet-wheel 80 passes over a fixed spring catch or pawl, 81, depressing it slightly and allowing it to slip over a certain number of teeth, depending upon its relative position to the ratchet-wheel 80. It will thus be readily seen that when the cradle is returned to its former position by the winch-handle 78, or otherwise, the catch or pawl will partially rotate the ratchet-wheel 80 to a small extent and advance the carriage for another line. The catch or pawl 81 is carried by the piece 82, capable of screw adjustment, as shown, whereby it may be caused to engage with a greater or less number of teeth on the ratchet-wheel, and thus rotate it to a greater or less extent, depending upon the size of the font of type employed. In lieu of using a ratchet-wheel, 37, and pawl 37*, Figs. 1, 2, 3, 10ª, and 10ᵇ, for communicating the backward motion of the band or wheel 6 to the shaft 25 the modified arrangement of feeding apparatus shown in Figs. 11, 12, 13, and 14 may be advantageously employed. In this arrangement the wheel 37 is provided with a roughened or finely-serrated edge or rim, and is actuated by a bar, 83, which carries a piece, 84, provided with a corresponding roughened or serrated lower surface. The bar 83 is pivoted at one end to a bar, 85, arranged to slide in a bearing, 86, fixed to the frame of the apparatus. At its other end the bar 83 is provided with an inclined slot, 87, into which takes a pin, 88, carried by a depending bar, 89, secured to the oscillating band or wheel 6.

90 is a spring secured at one end to the frame of the machine, its other end being arranged to press upon the bar 85 and prevent it moving freely in its bearing.

Figure 13:
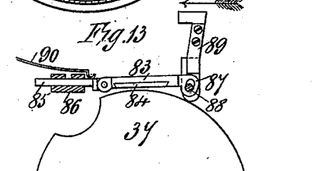
Fig. 13 is a similar view to Fig. 11, showing the parts in a different relative position.
Figure 14:
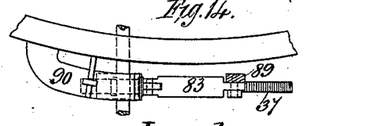
Fig. 14 is a plan of the same.

When the band or wheel 6 moves in the direction of the arrow, Fig. 13, caused by the depression of one of the finger-keys 8, the pin 88 first lifts the bar 83 (by reason of the inclined slot 87) from its lower position (shown in Fig. 11) to its upper position, (shown in Fig. 13,) in which position it is free from contact with the wheel 37. The pin 88 then forces the bar 85, by means of the bar 83, through its bearing 86 to an extent depending upon the width of the letter or character being impressed or printed. When the band or wheel 6 returns in the opposite direction to that shown by the arrow, the bar 83 first falls from its upper to its lower position into contact with the wheel 37, to which the remainder of the motion of the band or wheel is then imparted, and the cylinder or table 24 advanced, as before, for the impression or printing of the next letter or character. With this modified feeding arrangement smaller differences of feed may be obtained than with the ratchet-wheel 37 and pawl 37*, previously described.

Figure 15:
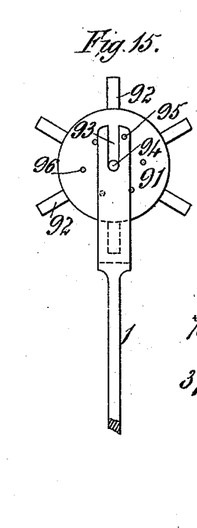
Figs. 15 and 16 are views, at right angles to each other, of a multiple type-carrier and attached type arm or lever.
Figure 16:
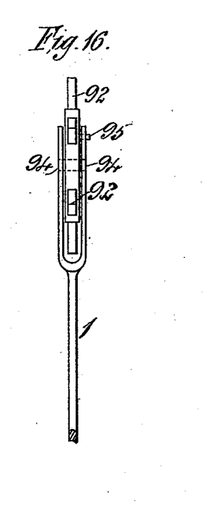

To enable the machine to impress or print letters or characters of different kinds without increasing the number of type levers or arms for the purpose, we secure to each type arm or lever a multiple type-carrier, 91, Figs. 15 and 16. Each multiple type-carrier is provided with a number of type-pieces, 92, of different kinds, and is so connected to its arm or lever that the type-piece thereon desired to be employed may be readily placed in position and secured for use. For this purpose, in the arrangement shown the arm or lever 1 is bifurcated at its upper part, the forked ends being slotted, as shown at 93, for the passage of the axle or pivots 94 of the type-carrier.

95 is a pin or stop, secured to one of the forked ends and adapted to take into one of a series of holes or recesses, 96, formed in the adjacent surface of the type-carrier and hold the latter in position for use. To enable the type-carrier 91 to be rotated and the pin or stop 95 to be withdrawn from one hole or recess 96 and engaged with another, the forked end of the type arm or lever that carries the said pin or stop is arranged to be sprung or bent away from the other.

To enable impressions or print to be arranged in a tabular form on the cylinder or table 24, a wheel, 97, (shown in dotted lines in Fig. 1,) may be secured to the shaft 25. This wheel is provided with a series of divisions on its outer side, a pointer, 98, fixed to the machine-frame, serving to admit of the shaft 25, and cylinder 24 being rotated to any desired definite extent.

By depressing the type or lever carrying a hyphen and rotating the cylinder or table 24, while the depressed character is kept in contact with the material thereon, the said material may be ruled.

What we claim is—

1. In apparatus for producing impressed or printed surfaces, the combination of type or type-pieces carried by arms or levers operated by finger-keys, a table or support for the material to be impressed or printed, a band or wheel, 6, mechanical means connecting or engaging said arms or levers with said band or wheel, whereby movement in a rotary sense is imparted to the latter by the depression of a finger-key, an adjustable stop limiting the movement of said band or wheel, whereby the spacing may be varied, and a spring, 16, or mechanical means for returning the said band or wheel to its original position, substantially as described.

2. In apparatus for producing printed surfaces, the combination, with a cylinder, or its equivalent, serving as a table for material to be impressed or printed, of means consisting of shafts or spindles 29 and 30, grippers 31 and 32, lever-arms 33, spring 35, pin or projection 48, plate 49, with curved projecting portion 68, pin 69, bent wire 50, spring 51, and rim or edge 52 for folding and gripping the said material upon the cylinder and automatically releasing the material from the cylinder, substantially as herein described.

3. In apparatus for producing impressed or printed surfaces, the combination, with a cylinder, serving as a table for material to be impressed or printed and a screw-threaded shaft by which intermittent motion is imparted to the said cylinder, or its equivalent, of means consisting of a band or wheel, 6, wheel 37, slotted bar 83, piece 84, bar 85, bearing 86, pin 88, bar 89, and spring 90, for imparting intermittent motion from the said band or wheel 6 to the said screw-threaded shaft, substantially as herein described, for the purpose specified.

THOMAS GEORGE DAW.
HILDER DAW.

Witnesses:
 EDWD. N. HOBBS,
 HUGH HUGHES,
*Both of 2 Pope's Head Alley, Cornhill, London.*